June 27, 1967  A. R. BOYLE ETAL  3,328,801
CHART READING AND RECORDING APPARATUS
Original Filed Dec. 5, 1963
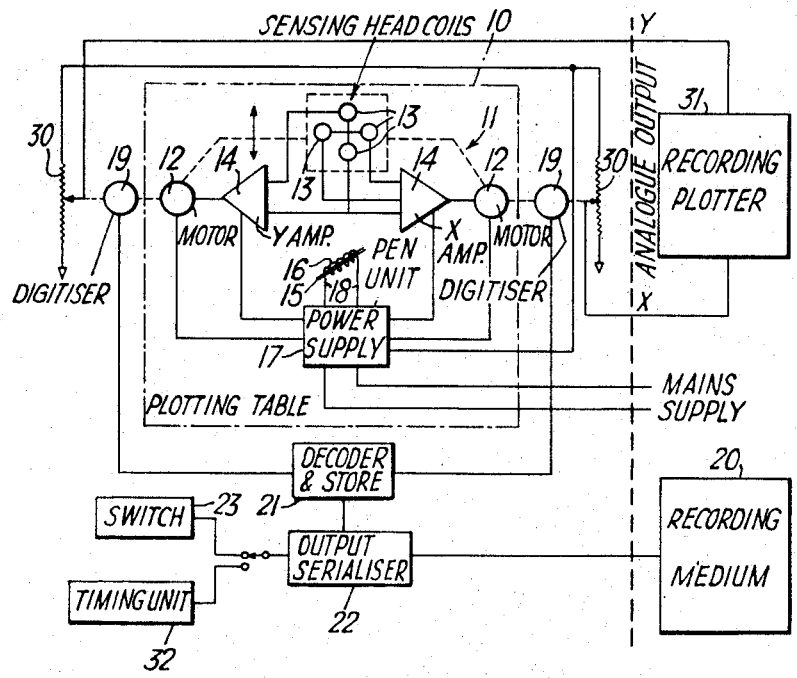
Inventors
ARCHIBALD RAYMOND BOYLE
AND DONALD ALFRED DOBBIN
By Irvin S. Thompson
Attorney

United States Patent Office 3,328,801
Patented June 27, 1967

3,328,801
CHART READING AND RECORDING APPARATUS
Archibald Raymond Boyle and Donald Alfred Dobbin, both of Glasgow, Scotland, assignors to D-Mac Limited, Glasgow, Scotland
Continuation of application Ser. No. 328,370, Dec. 5, 1963. This application May 25, 1966, Ser, No. 559,656
Claims priority, application Great Britain, Dec. 6, 1962, 46,059/62
5 Claims. (Cl. 346—31)

This application is a continuation of copending application Ser. No. 328,370, filed Dec. 5, 1963, now abandoned.

This invention relates to apparatus for reading and recording positions and/or the shapes of lines on a chart, map, diagram, drawing, plan or the like (hereinafter and in the claims referred to simply as "a chart").

It is an object of the present invention to provide apparatus for reading and recording position and/or the shapes of lines on a chart which apparatus is simple to operate and accurate in use, and which supplies the chart information as a suitable form for re-transmission or for conversion into another form, for example a digital form.

The present invention is apparatus for reading and recording positions and/or the shapes of lines on a chart comprising a manually movable index, sensing means coacting with said index to produce a signal dependent on the relative position of index and sensing means, means employing said signal to control the sensing means and move them in such manner as to bring said signal to a predetermined value and means recording in sequentially reproducible manner the motion of the sensing means.

The present invention is also apparatus for reading and recording positions and/or the shapes of lines on a chart the apparatus comprising a manually-operable magnetic device for indicating positions and/or following lines on a chart, sensing means for disposition on the other side of the chart from said magnetic device and for producing a differential signal in accordance with relative movement between said magnetic device and sensing means, a servo-mechanism operably associated with the sensing means and operable dependent on said differential signal to effect movement of the sensing means to reduce said differential signal, and means operable by output signals from the servo-mechanism to produce a record of the chart readings.

Preferably, the apparatus includes means for indicating when the sensing means is "locked-on" the magnetic device, i.e. when the sensing means and magnetic device are in alignment, at which state the output signal may be recorded by the recording means.

The magnetic device may be in the form of a member of high magnetic susceptibility energised by a coil fed from an alternating supply. Alternatively the device is in the form of a permanent magnet, or in the form of a disc having crosswires on its upper surface and a control coil buried within same. An important feature of the invention is that the device is held freely in the user's hand without restraint, for example mechanical linkages, pantographs or the like.

The servo-mechanism preferably comprises a servo-driven gantry and trolley arrangement operating in X and Y axes and carrying the sensing means.

The output to the recording means may be in digital form or analogue form from digitisers, potentiometers or other suitable means.

While reference is made to magnetic sensing it will be appreciated that any other suitable form of sensing can be employed; for example inductive, electrostatic, capacitive, optical or radiation.

An embodiment of the present invention will now be described with reference to the accompanying drawing which is a block circuit diagram of the apparatus according to the present invention.

The chart (not shown) is placed face upwards on a table 10 or other horizontal flat supporting surface.

The apparatus comprises a servo-mechanism 11 including servo-driven gantry and trolley arrangement (not shown) operating in X and Y axes mounted beneath the table surface. The trolley which is driven in each axis by a motor 12 carries a sensing means comprising two sensors or coils 13, in each axis. The servo-mechanism also includes servo-amplifiers 14 operated by the sensors or coils 13.

A magnetic device 15 is disposed above the chart, i.e. above the table 10, and comprises a suitably shaped piece of material of high magnetic susceptibility energized by a coil 16 fed from a low voltage alternating supply 17, via very light leads 18. The device, when in use, is held freely in the hand of the operator.

The servo-mechanism operates an output means, for example a digitiser 19 which gives the output information in digital form to the recorder 20 via a decoder and store unit 21 and an output serialiser 22, and in analogue form via the potentiometers 30 to a conventional X-Y recorder 31. The output information may be recorded by the recorder 20 on punched tape, magnetic tape or punched cards, and it may be transmitted to another, possibly remote, location in either the digital or analogue forms.

Indicating means, such as a lamp (not shown) is in circuit with the magnetic device 15 and sensing means 13 to inform the operator when these two components are in "locked-on" relationship. By this is meant that condition in which magnetic device 15 is directly above the sensing means 13 so that the circuit is balanced.

A suitable switch 23 is provided to permit output from the output serialiser 22 to the recorder 20 only when the magnetic device 15 and sensing means 13 are in "locked-on" relationship. This switch 23 may be manually or pedal operated, or it may be a pressure pad associated with the magnetic device 15.

In use, the operator places the magnetic device 15 on a line on the chart and the servo-mechanism 11 moves to the "locked-on" position, this being indicated by illumination of the lamp. The operator then moves the magnetic device 15 along the line. This creates differential signals in the sensing means 13, which signals are transmitted to the servo-mechanism 11 to drive the trolley and the sensing means 13 along a line corresponding to that being traced by the magnetic device 15. Simultaneously, outputs from the servo-mechanism 11 operate the recording means to produce the necessary record of chart information.

In modification, the magnetic device 15 is a permanent magnet while the sensing means consists of symmetrically disposed sensors or coils.

In another modification when using the device with an external projection system to read a projected image, the magnetic device is a small white square or disc of suitable material with crosswires marked on its upper surface, and the control coil 16 buried within same. This disc can be moved manually and easily about the reading surface by the operator and the projected image is always clearly visible on its upper surface. Due to the flat nature of the disc no tilting can occur and therefore no error can occur in positioning.

The sensing means may consist of five coils or sensors. The energising coil need not be in the follower disc but may be placed equidistant from the four sensing coils.

The disc in this instance may consist of a piece of magnetic material without any attached leads.

It will be appreciated that if the magnetic device is disposed between two sensors (e.g. pole pieces on which pick up coils are wound) then the voltages produced in the coils will be balanced when the point of the device is equidistant relative to the sensors. The resultant voltages can be compared, amplified and used to drive the servo-mechanism so as to position the coils equidistant from the point of the device.

In this way, the point of the device does not have to be directly between the coils but can be on an axial line some distance above the coils. This enables the servo-mechanism to be some distance below the device point and certain materials can be interposed in this space to act as a support for the chart, e.g. perspex.

It is to be noted that movement of the sensing head towards the "locked-on" position may occur from a position well outside the area of the sensing means itself, movement being dependent on the difference voltage generated in the two sensing coils due to the difference in distance between the sensing coils and the energizing coil. It is not necessary for the operator to place the trolley in the correct position since this will automatically occur.

The apparatus may be used to output continuous line information, in which case the parameter deciding when an output has to be made is usually time, i.e. a certain number of output co-ordinates per second. The output may, of course, be controlled by any other suitable parameter, for example, a reading of the X-axis can be effected every time the tens digit of the Y-axis changes. In this embodiment a timing unit 32 is used to control the output of the serialiser 22. This is particularly important as it enables the more difficult part of the curve—ones which normally would be followed more slowly by the operator—to possess a larger amount of co-ordinate information per centimeter.

Alternatively, the operator can press a switch every time he passes a particular point at which a readout is desired. Any output device such as paper tape punch, card punch and typewriter requires a finite time to output a position co-ordinate and for this reason the digitiser is "sampled" by a very short pulse, and the digital information "frozen" in the store until output has been completed. It is an important feature of the present invention that he can lift the magnetic device 15 to some distance when moving in between such positions. An automatic switch or the like (not shown) may be arranged on the reading surface to output information only when the device 15 is pressed on to the surface.

It is to be noted that while the magnetic device can be held quite freely in the hand when difficult shapes have to be followed, when straight lines or simple curves have to be drawn, the device can be placed against a ruler or curve to help in smoothness of generation.

The output at the serializer 22 normally appears in the form of X and Y co-ordinates. When producing the line from the recorded output, the accuracy of the line information mainly depends on the distance apart of the points selected, i.e. the time interval and this to some extent controls the speed of line reading or writing.

The output would normally be on to punched tape or punched cards or magnetic tape. The other parameter which must be taken into account is the speed of the output device. For example, with a simple card punch or tape punch lines must either be followed very slowly or co-ordinates can only be output at relatively large distances apart. This is satisfactory for meteorological information where points 1 cm. apart can give sufficient accuracy. However, for high accuracy work unless the speed of reading is to be severely curtailed it is necessary to output on to a high speed reading device such as magnetic tape.

The apparatus can also transmit its output information to another apparatus which can be operated at some distance from the first. In both cases, accuracies of the order 0.1% or better can be obtained.

Many different sizes of apparatus can be made to suit the convenience of the operator and the size of charts to be examined. For the highest accuracies with large areas it is best to divide the main area into small areas, for example 20 cm. x 20 cm.

The apparatus may be applied to the reading of information from strip charts. This is particularly useful if the chart is a complicated multichannel one involving considerable selection by the operator. He can merely point the device to the correct trace and the operator can move the chart past the reading position by a variable speed control possibly under foot operation.

Re-transmission of information is an important feature of the present invention. One apparatus can be used as a drawing device and other apparatus as a repeater. It is possible also for the receiver apparatus to be arranged as reading or writing apparatus. Thus, if one apparatus sends out a drawing which is repeated in selected receivers, any of these receivers can add information to the drawing and this can be repeated on all other apparatus including the original.

It should be noted that the apparatus can be employed as a reading unit if lines are already drawn but have to be followed and as a writing unit if the lines are drawn and followed at the same time.

It should be noted that instead of X and Y movement of the sensing head which gives Cartesian co-ordinate output, the sensing head movement may be angular and radial to give polar co-ordinate movement.

A subsidiary turntable may be carried on the sensing head and the rotational position of the turntable may be read out through the normal X-Y output. In this instance, a subsidiary energizing coil may be fitted to the white disc or magnetic pencil so that rotation of disc or pencil causes the turntable to rotate. By this means it is possible to determine the attitude of a component.

This arrangement is self-centering and can pick-up a radial angle.

If magnetic sensing is employed in both engaging coils then different frequencies are used. Alternatively, different forms of sensing are employed.

Reference to "lines" herein should be construed as including letters, digits, symbols and the like.

A suitable gantry and trolley arrangement consists of a gantry extending longitudinally of the table or supporting surface and movable transversely relative thereto, and a trolley, which carries the sensing head, movable along the gantry.

What is claimed is:

1. Apparatus for reading and recording positions and/or the shapes of lines on a chart, the apparatus comprising a manually operable magnetic device for indicating positions and/or following lines on a chart, sensing means for disposition on the other side of the chart from said magnetic device and for producing a differential signal in accordance with the relative position of said magnetic device and sensing means, a servo-mechanism operably associated with the sensing means and operable in response to said differential signal to effect movement of the sensing means in a direction to reduce said differential signal, said servo-mechanism including a gantry and trolley arrangement electrically operable in X and Y axes and carrying the sensing means, and means operable by output signals from the servo-mechanism to produce a record of the movement of the sensing means.

2. Apparatus for reading and recording positions and/or the shapes of lines on a chart, the apparatus comprising a manually operable magnetic device for indicating positions and/or following lines on a chart, the magnetic device being a member of high magnetic susceptibility and a coil fed from an alternating current supply, said member being energizable by said coil, sensing means for disposition on the other side of the chart from said magnetic device and for producing a differential signal in accordance with the relative position of said magnetic device and sensing means, a servo-mechanism operably associated with the sensing means and operable in response to said differential signal to effect movement of the sensing means in a direction to reduce said differential signal, and means operable by output signals from the servo-mechanism to produce a record of the movement of the sensing means.

3. Apparatus for reading and recording positions and/or the shapes of lines on a chart, comprising magnetic sensing means having primary and secondary coils, a manually movable index on which the primary coil is mounted for free movement in any direction relative to the secondary coil in a first plane, means mounting the secondary coil for movement in any direction in a second plane parallel to said first plane, means for producing a signal that varies with the distance between said primary and secondary coils, means responsive to said signal to move the secondary coil in said second plane in a direction to reduce said distance, and means for recording the motion of said secondary coil.

4. Apparatus as claimed in claim 3, and means for indicating when the primary and secondary coils are at a minimum distance from each other, and means operable upon the attainment of said minimum distance to actuate said recording means.

5. Apparatus as claimed in claim 3, said moving means comprising a gantry and trolley arrangement electrically operable in X and Y axes and carrying the secondary coil.

References Cited

UNITED STATES PATENTS

| | | | |
|---|---|---|---|
| 2,679,620 | 5/1954 | Berry | 318—19 |
| 2,835,858 | 5/1958 | Moseley | 318—31 |
| 2,871,432 | 1/1959 | Marzetta | 318—31 |
| 3,140,911 | 7/1964 | Johnson | 346—31 |

RICHARD B. WILKINSON, *Primary Examiner.*

STEPHEN J. TOMSKY, *Examiner.*

J. W. HARTARY, *Assistant Examiner.*